United States Patent
Wennberg et al.

(10) Patent No.: US 7,505,786 B2
(45) Date of Patent: Mar. 17, 2009

(54) METHOD AND MOBILE TELECOMMUNICATION NETWORK FOR DETECTION OF DEVICE INFORMATION

(75) Inventors: Martin Wennberg, Bromma (SE); Britt-Mari Svensson, Sollentuna (SE); Tommy Thorstensson, Bromma (SE)

(73) Assignee: Smarttrust AB, Stockholm (SE)

( * ) Notice: Subject to any disclaimer, the term of this patent is extended or adjusted under 35 U.S.C. 154(b) by 343 days.

(21) Appl. No.: 10/569,570

(22) PCT Filed: Sep. 15, 2004

(86) PCT No.: PCT/SE2004/001337

§ 371 (c)(1),
(2), (4) Date: Feb. 27, 2006

(87) PCT Pub. No.: WO2005/032183

PCT Pub. Date: Apr. 7, 2005

(65) Prior Publication Data

US 2007/0004455 A1    Jan. 4, 2007

(30) Foreign Application Priority Data

Oct. 2, 2003  (SE) .................................. 0302626

(51) Int. Cl.
H04M 1/00 (2006.01)
(52) U.S. Cl. .................................. 455/558; 455/556.1
(58) Field of Classification Search ................ 455/411, 455/435.1, 414.2, 433, 558; 379/114.27
See application file for complete search history.

(56) References Cited

U.S. PATENT DOCUMENTS

| 7,349,697 | B2 * | 3/2008 | Onaka et al. ............. 455/435.1 |
| 2004/0132449 | A1 * | 7/2004 | Kowarsch ................ 455/432.1 |
| 2004/0166839 | A1 * | 8/2004 | Okkonen et al. ............ 455/419 |
| 2005/0020259 | A1 * | 1/2005 | Herrero ....................... 455/433 |
| 2005/0075137 | A1 * | 4/2005 | Reemtsma .................. 455/559 |

FOREIGN PATENT DOCUMENTS

| EP | 1 098 489 A2 | 5/2001 |
| WO | WO 03/012574 A2 | 2/2003 |

* cited by examiner

Primary Examiner—George Eng
Assistant Examiner—Nam Huynh
(74) Attorney, Agent, or Firm—Fasth Law Offices; Rolf Fasth

(57) ABSTRACT

The mobile telecommunication network is used for detection of device information, such as subscriber information and equipment information. The network has a mobile station with subscriber information, a base station subsystem, and a network subsystem. The network is characterized by means for detecting device information from signals sent from the mobile station, a detector for handling the detected information, and a repository for storing device information. The method is characterized by detection of device information of a mobile station that attaches to the network. The detected device information is compared with the device information stored in the network and stored if it does not correspond to the information previously stored in the network.

6 Claims, 3 Drawing Sheets

METHOD AND MOBILE TELECOMMUNICATION NETWORK FOR DETECTION OF DEVICE INFORMATION

PRIOR APPLICATIONS

Figure 1:
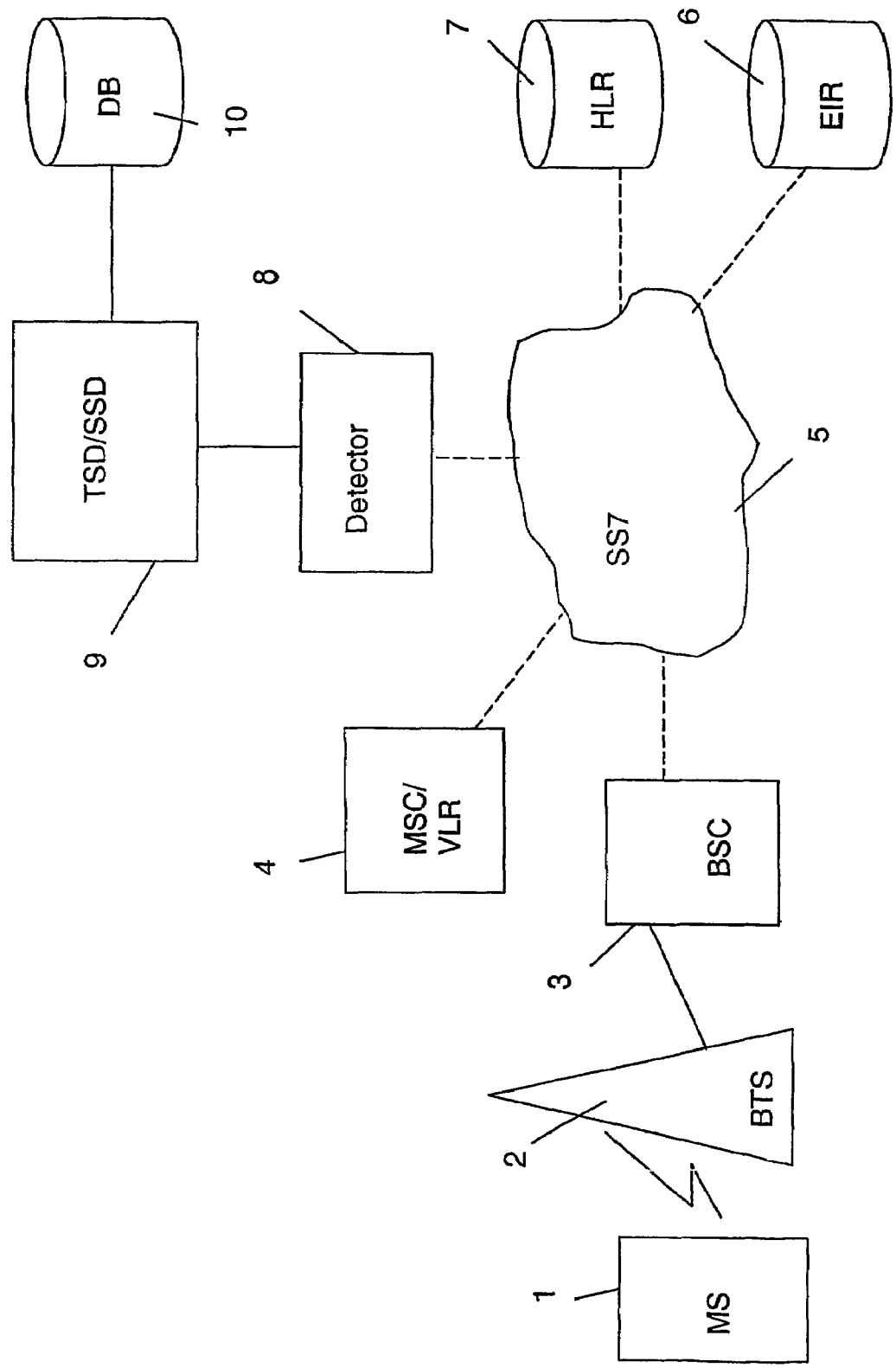

This is a US national phase patent application that claims priority from PCT/SE2004/001337, filed 15 Sep. 2004, that claims priority from Swedish Patent Application No. 0302626-7, filed 2 Oct. 2003.

1. Technical Field

The invention is concerned with a method and a mobile telecommunication network for detection of device information of mobile terminals used by different users.

2. Background Art

GSM, together with other technologies, is part of an evolution of wireless mobile telecommunication that includes e.g. General Packet Radio System (GPRS), and Universal Mobile Telecommunications Service (UMTS).

The Global System for Mobile Communication (GSM) is a standard for digital wireless communications with services, such as voice telephony. The Subscriber Identity Module (SIM) inside GSM phones was originally designed as a secure way to connect individual subscribers to the network but is nowadays becoming a standardized and secure application platform for GSM and next generation networks.

The SIM card is a smart card that saves subscriber information bout identity, subscription, subscription environment, radio environment and other information. The information in the SIM is stored in a logical structure of files, one of which containing the so called "phone book".

UMTS is the next ($3^{rd}$) generation mobile communication system, which provides an enhanced range of multimedia services, such as video. UMTS has specified the use of the USIM (universal SIM) as the evolution of SIM. In GSM and UMTS networks; the (U)SIM card is central both for subscriber identification and for providing value added services to users. Usually referred to as a SIM card, the USIM (UMTS Subscriber Identity Module) is the user subscription to the UMTS mobile network. The USIM contains relevant information that enables access onto the subscribed operator's network.

The functional architecture of a GSM system can be broadly divided into the Mobile Station, the Base Station Subsystem, and the Network Subsystem. The subscriber carries the mobile station, the base station subsystem controls the radio link with the mobile station and the network subsystem performs the switching of calls between the mobile users and other mobile and fixed network users The Mobile Station (MS) represents the only equipment the GSM user ever sees from the whole system. It actually consists of two distinct entities. The actual hardware is the Mobile Equipment (ME), which consists of the physical equipment, such as the radio transceiver, display and digital signal processors. The subscriber information is stored in the Subscriber Identity Module (SIM), implemented as a Smart Card.

The mobile equipment is uniquely identified by the International Mobile Equipment Identity (IMEI) being a unique code that corresponds to a specific GSM handset. The SIM card contains the International Mobile Subscriber Identity (IMSI), identifying the subscriber, a secret key for authentication, and other user information. The term "device information" comprises in this text both equipment information, such as the IMEI, and subscriber information, such as the IMSI. The IMEI and the IMSI are, however, independent and can thereby provide personal mobility.

The central component of the network subsystem is the mobile services switching center. This acts like a normal switching node of the PSTN (Public Switched Telephone Network) or ISDN (Integrated Services Digital Network) and connects the mobile signal to these fixed networks. It additionally provides all the functionality needed to handle a mobile subscriber, such as registration, authentication, location updating, handovers and call routing to a roaming subscriber. The Mobile Station Integrated Service Digital Network Number, MSISDN, is the standard international telephone number used to identify a given subscriber.

The operator declares the subscription in a database inside the network, which holds the correspondence between the IMSI and the MSISDN. By inserting the SIM card into another GSM terminal, the user is able to receive and make calls from that terminal, and receive other subscribed services.

Mobility management is a function in GSM and includes location management, security and authentication. When a mobile station is switched on in a new location area, or it moves to a new location area or a different operator's PLMN, it must register with the network to indicate its current location.

Normally, a location update request and the IMSI are automatically sent to the new location area's Mobile Switching Center having a Visitor Location Register, MSC/VLR, which records the location area information and then sends the location information to the subscriber's Home Location Register, HLR. The information sent to the HLR is normally the SS7 address of the new VLR, or it may be a routing number.

A procedure related to location updating is the IMSI attach and detach. A detach lets the network know that the mobile station is unreachable, and avoids having to needlessly allocate channels and send paging messages. An attach is similar to a location update, and informs the system that the mobile is reachable again. The activation of IMSI attach/detach is up to the operator on an individual cell basis.

Authentication involves the SIM card and the Authentication Center. A secret key, stored in the SIM card and the Authentication center together with a ciphering algorithm, are used to authenticate the user. Next, a security check is performed by means of the equipment identity (IMEI).

An equipment Identity Register (EIR) is a network database that stores lists of International Mobile Equipment (IMEI) numbers. The database is used to manage valid IMEIs on the network so that stolen terminals or terminals of wrong type would not be able to connect to the network. When a phone is switched on, its unique IMEI number is transmitted to the network and checked against EIR, which determines whether the phone can log onto the network to initiate and receive calls.

Thus, when a mobile terminal attaches to the network, it sends a signal to the network containing both IMSI end IMEI information. The IMSI is used for location update of the VLR/HLR registers, whereas the IMEI is used for the checking of invalid equipment in the EIR repository.

When a new (U)SIM is issued, a lot of information, both personal and to some extent operator defined, is lost, unless this information is copied from the old (U)SIM to the new (U)SIM. This could for example be the phone book.

Introducing a new terminal has other problems—since it is not personalized as (U)SIM cards are. Hence it is required to be configured with network settings to be enabled to use the different services the Mobile Service Provider offers. Apart from that, the same problem with personal information and services, as with the (U)SIM Cards, applies.

Today it is not possible to know what handset model a user is using, if not explicitly notified by the user. This is especially a problem when trying to keep a repository up to date with active handsets, potentially to be used for updating the handset with appropriate data.

OBJECT OF THE INVENTION

The object of the invention is to develop a solution for better management of subscriber and equipment information.

SUMMARY OF THE INVENTION

The mobile telecommunication network of the invention is used for detection of device information, such as subscriber information and equipment information. The network comprises a mobile station with subscriber information, a base station subsystem, and a network subsystem. The network of the invention is characterized by means for detecting device information from signals sent from the mobile station, a detector for handling the detected information, and a repository for storing device information.

The method of the invention is performed in a mobile telecommunication network for detection of device information such as subscriber information and equipment information. It is characterized by detection of device information of a mobile station that attaches to the network. The detected device information is compared with the device information stored in the network and stored if it does not correspond to the information previously stored in the network.

As was stated above, device information includes both equipment information and subscriber information. The most inventive features are concerned with the embodiment for detecting of subscriber information.

The invention thus provides a network and network based methods for detecting what devices (mobile station, i.e. handset and/or SIM) a mobile user is using, and means for provisioning them with relevant information.

The method of the invention is primarily implemented in the GSM or UMTS network, whereby the subscriber information, such as information about identity, subscription, subscriber environment, radio environment, etc. described by the IMSI, is stored in The Subscriber Identity Module (SIM) inside GSM phones and the Universal SIM (USIM) when implemented in the UMTS network.

The device information is either terminal information, such as the International Mobile Equipment (IMEI) number or subscriber information, such as the International Mobile Subscriber Identity (IMSI).

The detection of the device information is performed by detecting a signal sent from the mobile subscriber terminal when the terminal attaches the network.

The IMSI or IMEI value read from this signal is compared with the value previously stored in the respective repositories, which are new in the invention.

When the detected device information is equipment information such as the International Mobile Equipment (IMEI) number, the invention make use of a repository that stores lists of pairs of International Mobile Equipment (IMEI) numbers and International Mobile Subscriber Identity (IMSI) numbers. When the detected IMEI value does not correspond to the IMEI of the repository it is stored in said repository that stores pairs of IMEI/IMSI values.

When the detected device information is the International Mobile Subscriber Identity (IMSI) number, the invention makes use of a repository that stores lists of pairs of International Mobile Subscriber Identity (IMSI) numbers and The Mobile Station Integrated Service Digital Network (MSISDN) numbers.

If the IMSI or IMEI would differ from what was previously stored for this subscription a SIM or equipment switch is considered to have happened and the new value is stored in the respective repository.

The solution of the invention is based on standard GSM mechanisms and is not dependent upon any client software. This solution can also be integrated with network equipment from a specific vendor modified to send the required information.

The advantages of the invention are that automatic provisioning is possible on terminal switch, which solves the problems faced in the background art section. The solution to all the non-configured handsets is to automatically provision them with accurate configuration data when a handset is being used for the first time.

Moreover, personal settings from an old handset can be restored. When a user has started to use a new handset it could be updated with personal information, in addition to the network configuration data. Personal information that was on the old handset, and stored in the network, could be downloaded to the handset, upon user acknowledgement. Personal information could for example be WAP bookmarks, Java applets, logos, ringtones etc.

A detection of a handset switch will lead to that the system downloads the personal settings used in the old handset, previously stored in the system. Applications could also be downloaded and the system could even download the same applications potentially upgraded to suit the capabilities of the new handset, e.g. a game designed for a small screen used on the old handset could be replaced with the same game designed for a larger color screen—according to the capability of the new handset.

When a new SIM has been introduced it could be updated with information from an image of the old SIM card. Operator defined data, if not pre-personalized, could automatically be downloaded. Personal data if stored/backed-up in the operator's domain, e.g. the Phonebook, could be downloaded, preferably after a question been sent to the user (by e.g. Text SM, WIG push, or WAP push) and acknowledged by the same (via e.g. Text SM, WIG message, or WAP message).

In the following, the invention will be described by means of some embodiments of the invention by referring to figures. The invention is not restricted to the details of the description.

FIGURES

FIG. 1 shows an environmental view of a network of the invention, wherein an embodiment of the method of the invention can be implemented.

Figure 2:
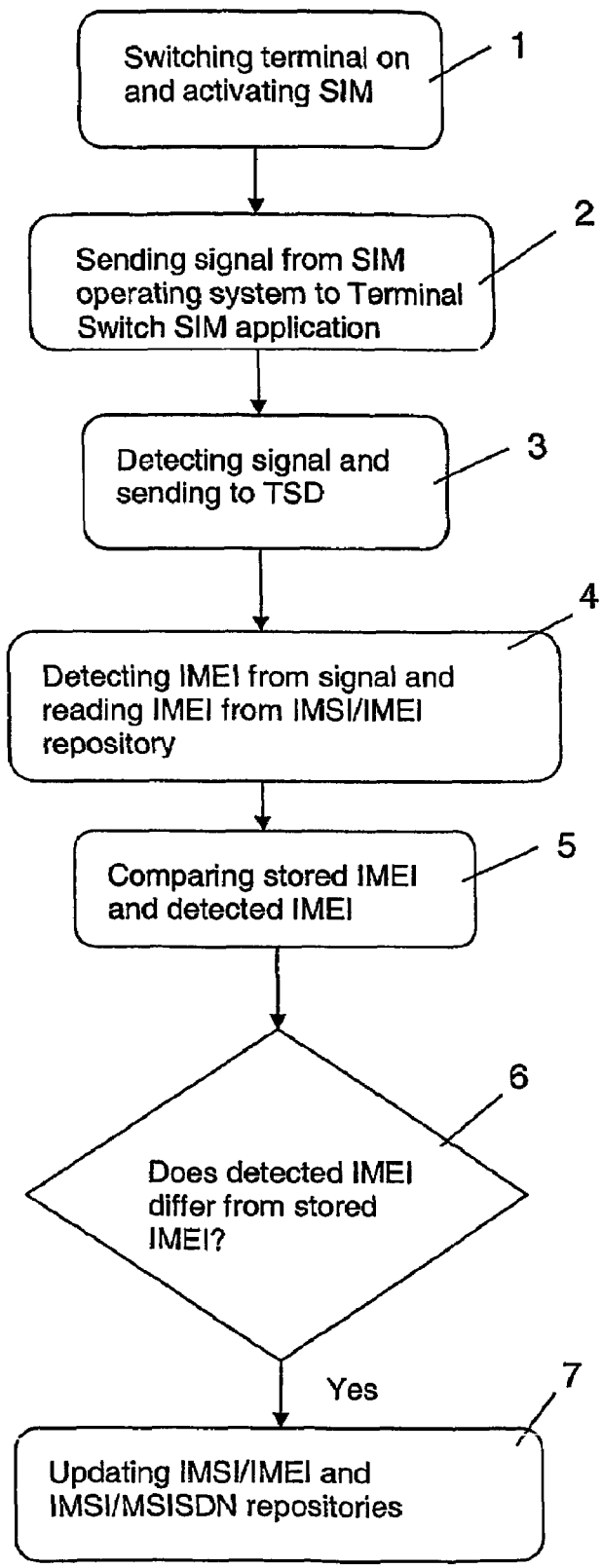

FIG. 2 presents a flow scheme of an embodiment of the method of the invention implemented in the network of FIG. 1

Figure 3:
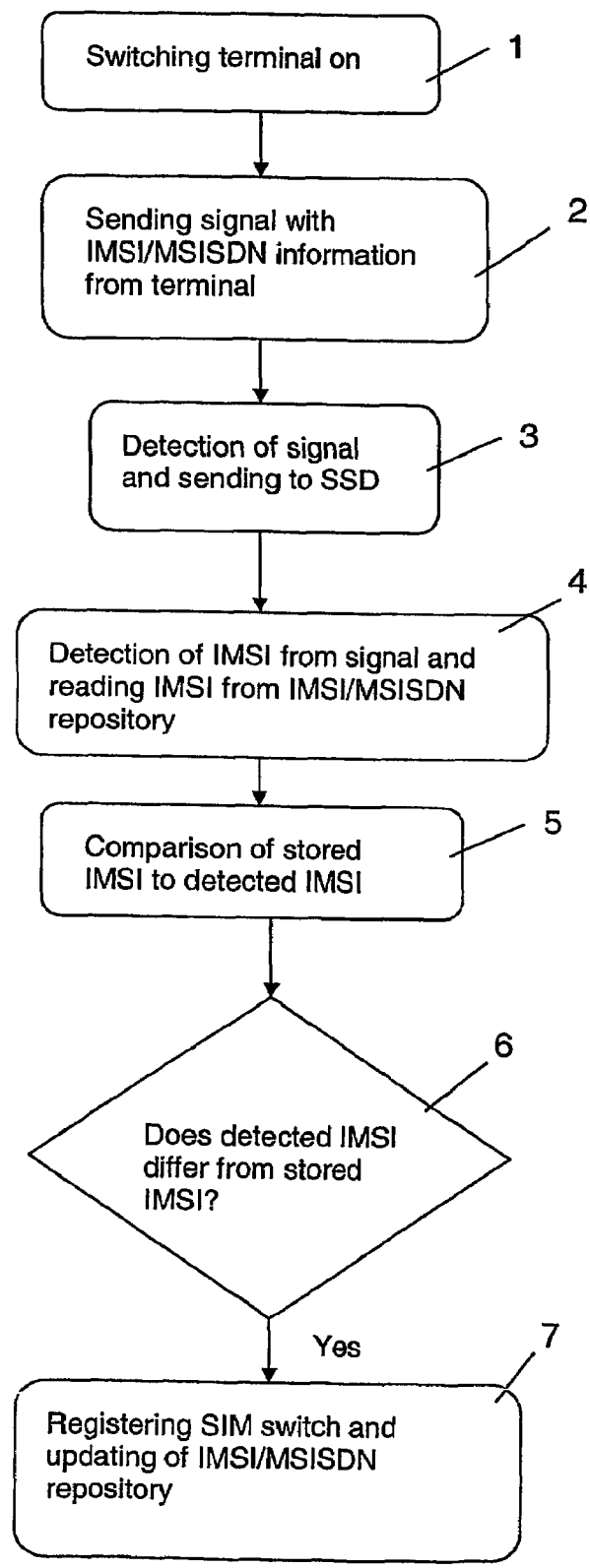

FIG. 3 presents a flow scheme of an other embodiment of the method of the invention implemented in the network of FIG. 1

DETAILED DESCRIPTION

FIG. 1 is an architectural view of the network structure, in which the method of the invention can be implemented. In FIG. 1, it is assumed that the invention is implemented in the GSM network.

The GSM network can be divided into three major parts. The first part, the Mobile Station (MS) with reference number 1 is carried by the subscriber.

The second one, the Base Station Subsystem (BSS) controls the radio link with the Mobile Station. A cell is formed by the coverage area of a Base Transceiver Station (BTS) having reference number 2 in FIG. 1, which serves the MS 1 in its coverage area. Several BTS stations together are controlled by one Base Station Controller (BSC) having reference number 3 in the figure. The BTS 2 and BSC 3 together form the Base Station Subsystem (BSS).

The third one, The Network Subsystem, the main part of which is the Mobile services Switching Center (MSC) with reference number 4 in the figure, performs the switching of calls between the mobile and other fixed or mobile network users, as well as management of mobile services, such as authentication. Not shown is the Operations and Maintenance center, which oversees the proper operation and setup of the network. The Mobile Station and the Base Station Subsystem communicate across the air interface through a radio link. The Base Station Subsystem communicates with the MSC 4 across a cable interface.

The communication from BSC 3 further is based on signaling system no. 7 (SS7) protocol, which is indicated with reference number 5 in the figure and constitutes the wireless network signaling infrastructure in GSM.

GSM defines a number of network databases that are used in performing the functions of mobility management and call control. These elements include the location registers consisting of the Home Location Register (HLR) having reference number 7 in FIG. 1, and the Visiting Location Register (VLR), the Equipment Identity Register (EIR) with reference number 6 in FIG. 1 and the Authentication Center (AUC), which is not shown in FIG. 1.

The HLR maintains and updates the mobile subscribers' location and service profile information. The HLR subscriber information includes the International Mobile Subscriber Identity (IMSI), service subscription information, location information (the identity of the currently serving Visitor Location Register (VLR) to enable the routing of mobile-terminated calls), service restrictions and supplementary services information. The HLR handles SS7 transactions with both Mobile Switching Centers (MSCs) and VLR nodes, which either request information from the HLR or update the information contained within the HLR.

The Visitor Location Register (VLR) is a database that contains temporary information about subscribers currently located in a given MSC serving area, but whose Home Location Register (HLR) is elsewhere. This information is needed to serve visiting subscribers. When a mobile subscriber roams away from his home location and into a remote location, SS7 messages are used to obtain information about the subscriber from the HLR, and to create a temporary record for the subscriber in the VLR. The VLR is defined as a stand-alone function but is usually viewed as a part of the MSC. There is usually one VLR per MSC.

The EIR 6 is used to list those subscribers equipment identities, which are used for identification of unauthorized subscriber equipment, and hence denial of service by the network. The AUC (not shown) provides the keys and algorithm for maintaining security of subscriber identities and for encrypting information passed over the air interface.

The GSM specifications have defined logically separate functions and standard interfaces for each of the databases to allow each function to be implemented on a physically separate network component.

SS7 is a global standard for telecommunications defined by the International Telecommunication Union (ITU) Telecommunication Standardization Sector (ITU-T). The SS7 standard defines the procedures and protocol by which the above network elements exchange information over a digital signaling network to effect wireless (cellular) and wireline call setup, routing and control, management, wireless services, wireless roaming, and mobile subscriber authentication, enhanced call features thus providing efficient and secure worldwide telecommunications.

All the above functions are parts of the GSM standard. When implemented in GSM, the invention introduces some further functions in the network.

An inventive function in FIG. 1 is a detector 8 that detects SS7 signals in the network of the invention when a mobile subscriber terminal is attaching to the network. The detected attach signal is sent to a Terminal Switch Detector (TSD) 9, which interprets the signal by means of a repository 10 connected to the TSD 9. The inventive functions in FIG. 1 is the listener 8, the TSD 9 and the repository 10 that contains lists of pairs of IMEI/IMSI values.

It is further mentioned that when TSD gets the information that a subscriber has changed telephone (the IMEI/IMSI pair updated with a new IMEI), TSD then updates the repository to remember the information and sends a signal to those components, which are interested in knowing that a subscriber has changes telephone (a terminal switch has taken place). This change is interesting because it is now known that an unconfigured telephone exists and that suitable things can be sent to the telephone to have it work with Global Packet Radio Services (GPRS), Wireless Application Protocol (WAP), e-mail etc.

In another embodiment of the invention, there is the same detector 8 but, instead of the TSD, the detected attach signal is sent to an inventive SIM Switch Detector (SSD) 9, which interprets the signal by repository 10. In this embodiment, the repository contains lists of pairs of MSISDN/IMSI values.

FIG. 2 presents a flow scheme of an embodiment of the method of the invention used when a mobile terminal (also called mobile station) attaches to the network, here a network according to FIG. 1. It is assumed that the user of the mobile terminal has changed his mobile terminal but kept his old SIM card by transferring it to the new terminal.

When the terminal is switched on (step 1 of FIG. 2), a signal with information about the International Mobile Equipment Identity (IMEI), i.e. the unique code that corresponds to a specific GSM terminal, is sent to the network (step 2 of FIG. 2) for Equipment Identity check against the EIR register.

As the wireless network keeps track of the location of the location of each mobile terminal, the mobile terminal informs the network about the current location of the mobile terminal each time the terminal is switched on. The subscriber (when turning his mobile device on) uses the IMSI for his connection to the network. The signal sent in step 2 therefore also contains, in addition to the IMEI, SIM card information for identifying the subscriber, a secret key for authentication, and other user information, i.e. the International Mobile Subscriber Identity (IMSI) and The Mobile Station International ISDN Number, MSISDN, the standard international telephone number used to identify a given subscriber.

Thus, when the mobile terminal attaches to the network, it sends a signal to the network containing both IMSI and IMEI information. The IMSI is used for location update of the VLR/HLR registers, whereas the IMEI is used for the checking of invalid equipment in the EIR repository.

In the normal case, a location update request and the IMSI are automatically sent to the new location area's Mobile Switching Center having a Visitor Location Register, MSC/VLR, which records the location area information, and then sends the location information to the subscriber's Home Location Register, HLR. The information sent to the HLR is normally the SS7 address of the new VLR In the method of the invention, the signal of step 2 that is sent to the MSC and handled within the SS7 network by the different entities, is in step 3 detected by a listener in the SS7 network and sent to a Terminal Switch Detector (TSD) 9, which interprets the signal by means of a repository 10 connected to the TSD 9.

The repository connected to the TSD 9 contains tables for matching given IMSI and IMEI values. In step 4, the TSD 9 therefore detects the IMEI from the signal of step 3 (the IMEI can also be asked from the network if not detected if the data is stored by some component in the network) and reads the IMEI stored in the IMSI/IMEI database.

The new IMEI value detected from the location update signal sent by the mobile terminal to the network when switching on and the stored IMEI are then compared in step 5. If the values differ from each other and TSD sees that the new IMEI has changed, which is noted in step 6 of FIG. 2, the IMSI/IMEI repository is updated (step 7) by writing the new value pair IMEI/IMSI in the database.

FIG. 3 presents a flow scheme of an embodiment of the method of the invention used when a mobile terminal attaches to the network here a network according to FIG. 1. It is assumed that the user of the mobile terminal has changed his SIM card but kept his old terminal by inserting a new SIM into the old terminal and removing the old one.

When the terminal is switched on (step 1 of FIG. 3), a signal is sent to attach the subscriber to the network (step 2 of FIG. 3) containing SIM card information for identifying the subscriber, a secret key for authentication, and other user information, i.e. the International Mobile Subscriber Identity (IMSI) and The Mobile Station International ISDN Number, MSISDN, the standard international telephone number used to identify a given subscriber.

In the method of the invention, the signal of step 2 that is sent to the MSC and handled within the SS7 network by the different entities, is in step 3 detected by a listener and sent to a SIM Switch Detector (SSD), which interprets the signal by means of a repository 10 connected to the SSD 9. The SSD checks the SIM repository in order to see if this IMSI already is attached to the MSISDN.

The repository connected to the SSD 9 contains tables for matching given IMSI and MSISDN values. In step 4, the SSD 9 therefore detects the IMSI from the signal of step 3 reads the old IMSI/MSISDN pair from the repository and compares it in step 5 with the new IMSI/MSISDN values detected from the location update signal sent by the mobile terminal to the network when switching on. If SSD sees that the IMSI/MSISDN combination is new, which is noted in step 6 of FIG. 3, it writes the new value pair in the repository and SIM switch is registered in step 7.

While the present invention has been described in accordance with preferred compositions and embodiments, it is to be understood that certain substitutions and alterations may be made thereto without departing from the spirit and scope of the following claims.

The invention claimed is:

1. A method in a mobile telecommunication network for detection of subscriber information, the network comprising a mobile station, a repository for storing subscriber and telephone number information, and means for detecting signals sent from the mobile subscriber terminal, the method comprising:
   providing the mobile station with a subscriber identity module having subscriber information stored therein,
   switching from an old subscriber identity module (SIM) to a new SIM in the mobile station,
   detecting subscriber information of a mobile station attaching to the network,
   comparing the detected subscriber information with the subscriber and telephone number information stored in the network,
   storing the detected subscriber information in the network when the detected subscriber information does not correspond to the information previously stored in the network, and registering that a switch from the old SIM to the new SIM in the mobile station has taken place, and
   updating the new SIM with information from the old SIM stored in the network.

2. A method of claim 1, wherein the detection of the subscriber information is performed by detecting a location update signal sent from the mobile subscriber terminal when the terminal is attaching the network.

3. A method of claim 1, wherein the network is based on GSM or UMTS.

4. A method of claim 3, wherein the repository stores lists of pairs of International Mobile Subscriber Identity(IMSI) numbers and Mobile Station Integrated Service Digital Network (MSISDN) numbers.

5. A method of claim 4, wherein the detected subscriber information is the International Mobile Subscriber Identity (IMSI) number.

6. A method of claim 4, wherein a detected IMSI value not corresponding to the IMSI of the repository is stored in said repository storing pairs of IMSI/MSISDN values.

* * * * *